(12) United States Patent
Yoon

(10) Patent No.: US 8,467,772 B2
(45) Date of Patent: Jun. 18, 2013

(54) MOBILE TERMINAL AND TELETEXT INFORMATION PROVIDING SYSTEM AND METHOD USING THE SAME

(75) Inventor: Sang-Ho Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 1527 days.

(21) Appl. No.: 11/459,116

(22) Filed: Jul. 21, 2006

(65) Prior Publication Data

US 2007/0021146 A1 Jan. 25, 2007

(30) Foreign Application Priority Data

Jul. 22, 2005 (KR) .................. 10-2005-0067022

(51) Int. Cl.
*H04M 3/42* (2006.01)
(52) U.S. Cl.
USPC ....................................... 455/414.1; 455/566
(58) Field of Classification Search
USPC ............ 455/414.1, 566, 550.1; 370/259–271; 379/157–158
See application file for complete search history.

(56) References Cited

U.S. PATENT DOCUMENTS

| 6,766,163 | B1 * | 7/2004 | Sharma ...................... 455/412.1 |
| 2003/0054806 | A1 * | 3/2003 | Ho et al. ........................ 455/414 |
| 2004/0077340 | A1 * | 4/2004 | Forsyth ...................... 455/414.1 |
| 2006/0009243 | A1 * | 1/2006 | Dahan et al. .................. 455/466 |
| 2006/0128355 | A1 * | 6/2006 | Aaron ........................ 455/404.1 |

* cited by examiner

*Primary Examiner* — Ajit Patel
(74) *Attorney, Agent, or Firm* — KED & Associates LLP

(57) ABSTRACT

Disclosed are a mobile terminal and a Teletext information providing system, and particularly, a system and method for providing latest updated Teletext information. The mobile terminal comprises: a wireless communication unit which receives a Teletext updated from a WAP server; a Teletext buffer memory which stores specific page information of the received Teletext; a central processing unit which controls the display of the specific page information of the Teletext on the basis of time information set by a user; and a Teletext update display unit which displays that the specific page information of the Teletext is received.

18 Claims, 4 Drawing Sheets

MOBILE TERMINAL AND TELETEXT INFORMATION PROVIDING SYSTEM AND METHOD USING THE SAME

BACKGROUND OF THE INVENTION

1. Field of the Invention

The present invention relates to a mobile terminal and a Teletext information providing system and method, and more particularly to, a system and method for providing latest updated Teletext information.

2. Description of the Prior Art

In general, Teletext services were developed for broadcasting, and are known to offer information, including regional and community information, weather information, and airport schedules, to a number of users by text or simple text/graphics through their respective distinctive pages. Teletext consists of pages, each of the pages comprising a header, a body, and additional information. Here, the header describes page number information and how a page is composed, the body describes information on main contents, and the additional information describes an extension function like a page link. Also, in analog broadcasting, a Teletext service performs decoding by identifying Teletext data based on a framing code, while in digital video broadcasting (DVB), it performs decoding after confirming information of Teletext on the basis of the stream-ID of a packetized elementary stream (PES).

Meanwhile, in mobile communication apparatuses, there are no such specific standards for Teletext services as broadcasting standards. They usually employ a method in which Teletext information is received by accessing to the internet using a WAP (Wireless Application Protocol), a wireless LAN, etc., or a channel provider transmits summary information to users by SMS (short message services). Here, the WAP means the protocol that can reduce an amount of data to process them by a mobile terminal with a small screen in order to implement a function such as the current internet browser in the terminal, and the SMS means the service which enables data having a relatively short length (usually, 80 to 160 bytes) to be transmitted over a mobile communication network.

A typical conventional method of transmitting Teletext information to a user will be described below with reference to FIGS. 1 and 2.

FIG. 1 is a flow chart illustrating a method of retrieving Teletext information using a WAP in a conventional mobile communication apparatus.

Referring to FIG. 1, firstly, a mobile terminal user accesses to a WAP server provided by a communication service provider in order to obtain newly updated Teletext information, and then accesses to a Teletext service provided by a service provider. Thereafter, a series of steps of searching for information of a specific Teletext page is repeated.

FIG. 2 is a flow chart illustrating a method of providing Teletext information by SMS in the relationship between a conventional user and a channel service provider.

Referring to FIG. 2, a user accesses to the homepage of a Teletext service provider, and then subscribes to a Teletext service on the homepage. Afterwards, the Teletext service provider transmits Teletext summary information to the user by SMS.

However, as described above, the conventional method of retrieving Teletext information through a WAP has the inconvenience that update times of Teletext pages provided by a Teletext service provider are not consistent, so that a WAP server must be kept accessed continuously in order to update latest information of a specific page.

Also, in case of displaying Teletext information using SMS, though it is not necessary to use a WAP server, the WAP server can process only text or simple text graphics information, so it cannot process high-volume graphics but obtain only summarized specific pages Besides, there is a problem that when the terminal is powered off or busy, the reliability is limited regarding whether or not a corresponding message is received.

BRIEF DESCRIPTION OF THE INVENTION

Therefore, an object of the present invention is to provide a mobile terminal, which retrieves latest update information of a Teletext, even if a WAP is not accessed, to provide latest updated specific page information of the Teletext, and a Teletext information providing system and method using the same.

Another object of the present invention is to provide a mobile terminal, which allows latest update information on specific page information of a Teletext to which a user wants to subscribe to be provided as large-volume information, such as graphics, and a Teletext information providing system and method using the same.

To achieve the above objects, there is provided a mobile terminal in accordance with the present invention, comprising: a wireless communication unit which receives a Teletext updated from a WAP server; a Teletext buffer memory which stores specific page information of the received Teletext; a central processing unit which controls the display of the specific page information of the TEletext on the basis of time information set by a user; and a Teletext update display unit which displays that the specific page information of the Teletext is received.

Additionally, to achieve the above objects, there is provided a Teletext information providing system using a mobile terminal in accordance with the present invention, comprising: a Teletext service provider which provides Teletext information by user subscription; a WAP server which retrieves and stores specific page information of the Teletext subscribed by the user among the Teletext information provided from the Teletext service provider, determines whether the stored specific page information of the Teletext is newly updated information or not, and transmits the same according to the result of determination; and a mobile terminal which processes and displays specific pages of the Teletext provided from the WAP server.

Additionally, to achieve the above objects, there is provided a Teletext information providing method using a mobile terminal in accordance with the present invention, comprising: storing, in a database of a WAP server, specific page information of a Teletext to which a user wants to subscribe among Teletext information provided by a Teletext service provider; and when the Teletext information is received from the Teletext service provider, retrieving latest update information on specific pages of the Teletext from the WAP server, and automatically providing the specific pages of the Teletext to the user.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Preferred embodiments of the present invention will now be described in detail with reference to the accompanying drawings.

In the following description, it should be noted that only those parts necessary for an understanding of the operation and effects of the present invention will be described, and description of other parts will be omitted so as not to obscure the invention.

In the following description, specific details of a mobile terminal and a Teletext information providing system and method using the same in accordance with the present invention are shown to help more general understanding of the present invention. It will be apparent to those skilled in the art that the invention can be easily embodied without such specific details or with the change of the specific details.

Figure 1:
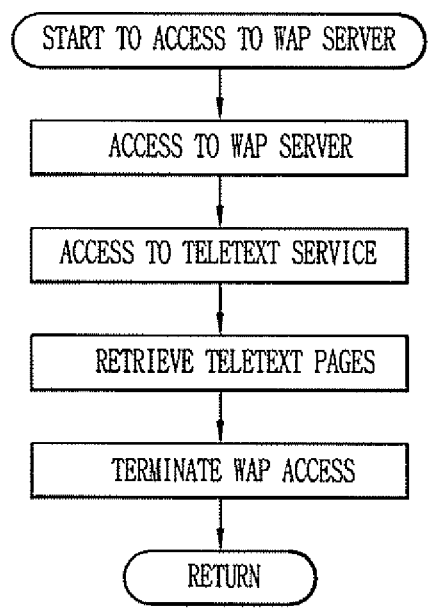
FIG. 1 is a flow chart illustrating a method of retrieving Teletext information using a WAP in a conventional mobile communication apparatus.
Figure 2:
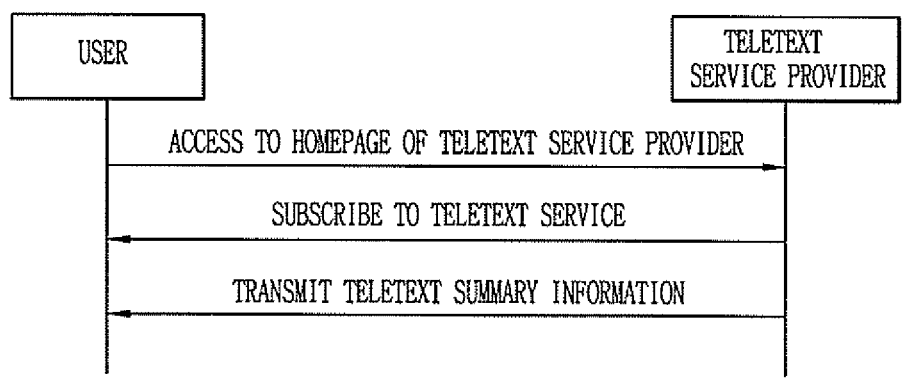
FIG. 2 is a flow chart illustrating a method of providing Teletext information by SMS in the relationship between a conventional user and a channel service provider.
Figure 3:
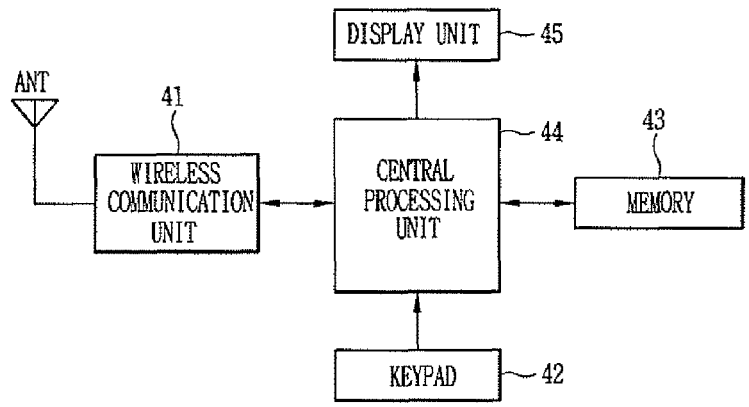
FIG. 3 is a block diagram showing the internal configuration of a mobile terminal in accordance with an embodiment of the present invention.

FIG. 3 is a block diagram showing the internal configuration of a mobile terminal in accordance with an embodiment of the present invention.

Referring to FIG. 3, a wireless communication unit 41 processes audio signals for call origination and termination and typical text messages and the reception of specific page information of a Teletext in accordance with an embodiment of the present invention. Here, the wireless communication unit 41 may include a RF transmitter for up-converting and amplifying a frequency of a signal to be transmitted, a RE receiver for low-noise amplifying a received signal and down-converting a frequency of the received signal, and a CODEC for coding and modulating the signal to be transmitted and demodulating and decoding the received signal. Here, the CODEC has a data CODEC for processing packet data and the like and an audio CODEC for processing an audio signal such as voice.

A keypad 42 includes keys necessary to input number and letter information and function keys necessary to set various functions. More specifically, the keypad 42 can include function keys for receiving Teletext information and so on in accordance with an embodiment of the present invention.

A memory 43 can comprise program and data memories, and the like. The program memory can store programs for controlling the overall operation of the mobile terminal, and programs corresponding to Teletext services in accordance with an embodiment of the present invention. The data memory performs a function of temporally storing data generated while the above programs are executed. Further, the data memory stores Teletext specific page information.

A central processing unit 44 controls the overall operation of the mobile terminal. More specifically, the central processing unit 44 controls the overall operation corresponding to Teletext services in accordance with an embodiment of the present invention. Also, the central processing unit 44 controls such that a user may access to a Teletext service provider via a WAP server to subscribe to specific pages of a Teletext. Further, the central processing unit 44 controls such that if information on the subscribed specific pages of the Teletext is updated information, the specific pages of the Teletext may be received through the wireless communication unit and displayed on a display unit 45.

The display unit 45 displays messages generated while the programs are executed under the control of the central processing unit 44. The display unit 45 also displays screen data corresponding to Teletext services in accordance with an embodiment of the present invention. The display unit 45 can include a LCD controller, a memory capable of storing image data, a LCD element, and so on. When the LCD is implemented using a touch-screen system, the keypad 42 and the LCD can serve as an input unit.

A system configuration for providing Teletext information using such a mobile terminal of the present invention will be described in detail with reference to the accompanying drawings.

Figure 4:
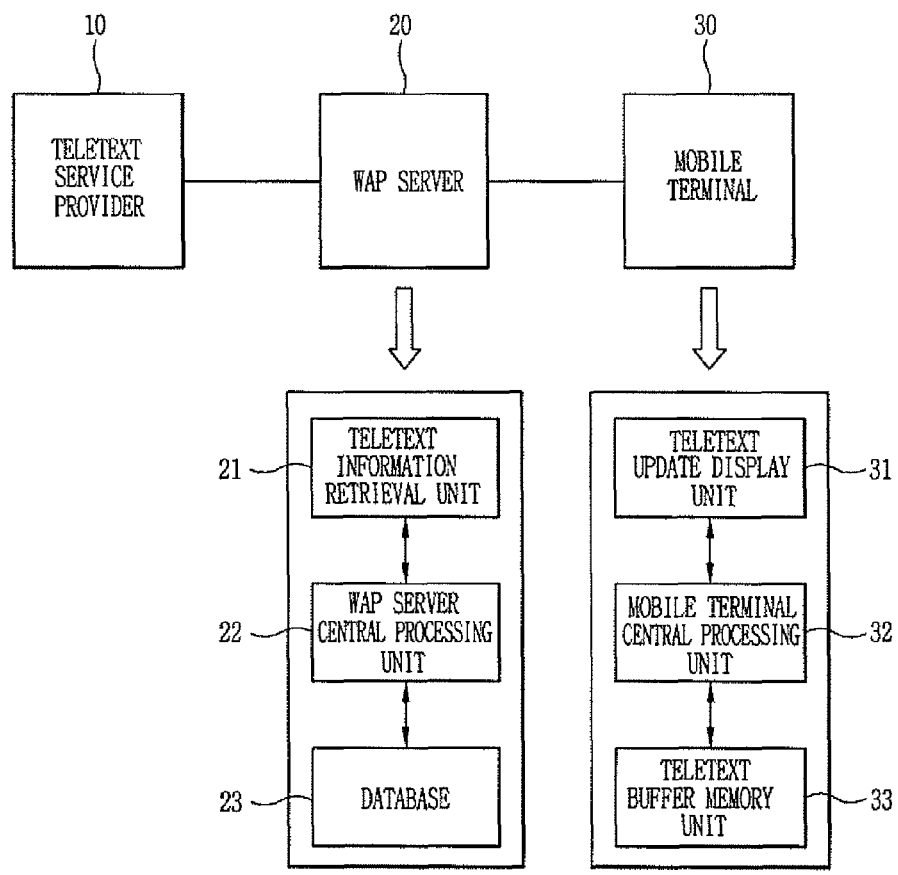
FIG. 4 is a block diagram showing a Teletext information providing system using a mobile terminal in accordance with an embodiment of the present invention.

FIG. 4 is a block diagram showing a Teletext information providing system using a mobile terminal in accordance with an embodiment of the present invention.

Referring to FIG. 4, the Teletext information providing system using a mobile terminal comprises: a Teletext service provider 10 which provides Teletext information by user subscription; a WAP server 20 which retrieves and stores specific page information of the Teletext subscribed by the user among the Teletext information provided from the Teletext service provider 10, determines whether the stored specific page information of the Teletext is newly updated information or not, and transmits the same according to the result of determination; and a mobile terminal 30 which processes and displays specific pages of the Teletext provided from the WAP server 20.

The WAP server 20 comprises: a Teletext information retrieval unit 21 which retrieves specific pages of the Teletex that the user wants to be provided with among the Teletext information provided by the Teletext service provider 10; a database 23 which stores information of specific pages of the Teletext that the user subscribed to among the Teletext information provided by the Teletext service provider 10; and a CPU (central processing unit) of the WAP server which automatically provides newly updated information on specific pages of the Teletext to the mobile terminal when the information of the specific pages of the Teletext is determined as newly updated information by comparing the information of the specific pages of the Teletext provided from the Teletext information retrieval unit and the Teletext page information pre-stored in the database 23.

The mobile terminal 30 comprises: a Teletext update display unit 31 which displays the reception of update information on specific pages of the Teletext to the user on the screen upon receipt of newly update information on specific pages of the Teletext from the WAP server 20; a buffer memory unit which stores the received specific page information of the Teletext; and a central processing unit 32 of the mobile terminal which controls the operation for processing the specific page information of the Teletext and displaying the same on the screen on the basis of time information set by the user or the size of pages stored in the buffer memory unit 33. Here, the central processing unit 32 of the mobile terminal may be the central processing unit 44 of FIG. 3. Also, the Teletxt update display unit 31 may be the display unit 45 of FIG. 3. Also, the Teletext buffer memory 33 may be a memory 43 of FIG. 3.

Figure 5:
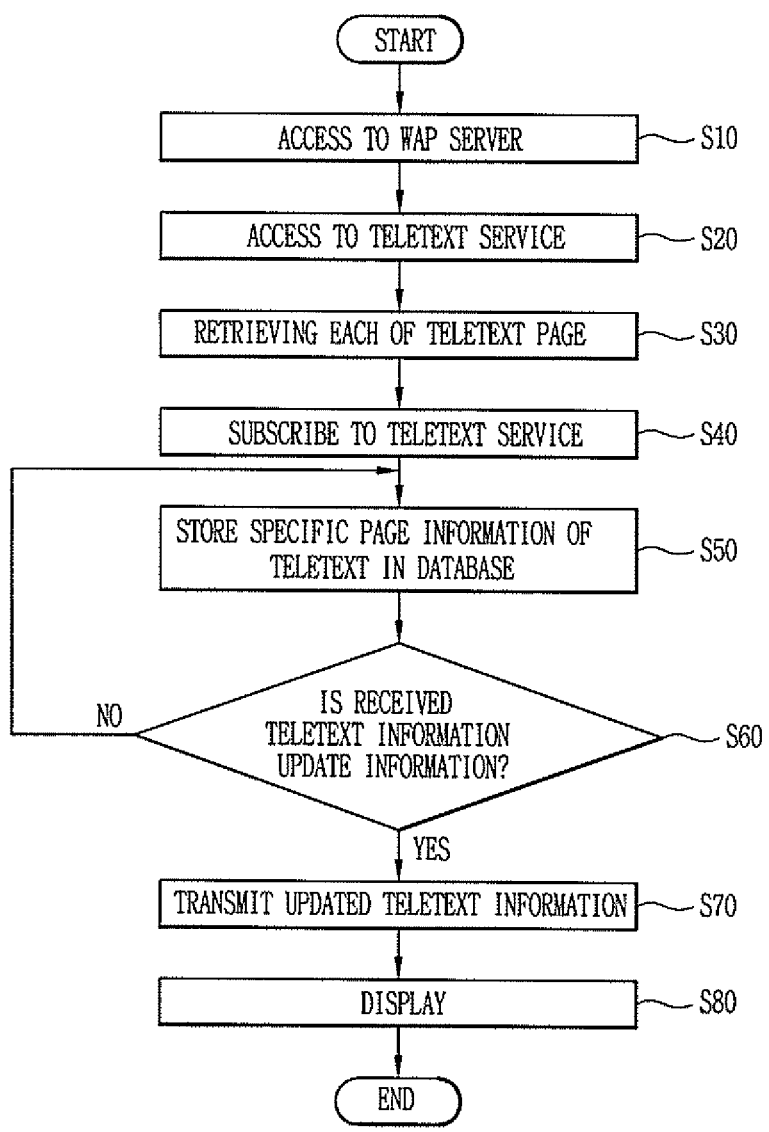
FIG. 5 is a flow chart of a Teletext information providing method using a mobile terminal in accordance with the present invention.

FIG. 5 is a flow chart of a Teletext information providing method using a mobile terminal in accordance with the present invention.

Referring to FIG. 5, the Teletext information providing method using a mobile terminal comprises: (S10) accessing to a WAP server 20 via a mobile terminal 30; (S20) accessing to a Teletext service provider 10's Teletext service via the WAP server 20; (S30) retrieving each of Teletext pages provided by the Teletext service provider 10; (S40) subscribing to specific pages of the Teletext from the Teletext service provider 10; (S50) storing information on the specific pages of the Teletext in a database of the WAP server 20; (S60) determining whether Teletext information received from the Teletext service provider 10 is newly updated information by comparing the received Teletext information and the information on the specific pages of the Teletext stored in the database; (570) if the received Teletext pages are determined as newly updated information, transmitting the specific page information to the mobile terminal 30 of the user; and (SS0) processing the transmitted specific page information of the Teletext and displaying the same on the screen via the mobile terminal.

Operation of the thus-configured Teletext information providing system using a mobile terminal in accordance with the present invention will be described below.

The present invention has the following two features. First, the user subscribes to specific pages of a Teletext from the Teletext service provider 10, and stores information on the specific pages of the Teletext that the user wants among Teletext information provided by the Teletext service provider 10. Second, upon receiving the Teletext information from the Teletext service provider 10, latest update information on the specific pages of the Teletext is retrieved, and the specific pages of the Teletext are automatically provided to the user's mobile terminal 30.

More concretely, firstly, the user accesses to the WAP server 20 via a mobile terminal 30, and the accesses a Teletext service provider 10. Next, the user retrieves each of Teletext pages provided by the Teletext service provider 10 to request the Teletext service provider 10 for subscription to specific pages that the user wants. Afterwards, information on the specific pages of the Teletext is stored in the database 23 of the WAP server 20, and then the access to the WAP server 20 is terminated.

Meanwhile, operation of the WAP server upon receiving Teletext information from the Teletext service provider will be described.

Firstly, the WAP server 20 retrieves specific pages of a Teletext that the user wants to be provided with among the Teletext information provided from the Teletext service provider 10 through a Teletext information retrieval unit 21, and then stores them in the database 23.

Afterwards, the CPU (central processing unit) 22 of the WAP server automatically provides newly updated information on specific pages of the Teletext to the user's mobile terminal when the information of the specific pages of the Teletext is determined as newly updated information by comparing the information of the specific pages of the Teletext provided from the Teletext information retrieval unit and the Teletext page information pre-stored in the database 23.

Finally, the user processes the transmitted specific pages information of the Teletext via the mobile terminal, and displays it on the screen of the mobile terminal 30. Here, the information on the specific pages of the Teletext is delivered by EMS (enhanced message service) for high-volume transmission or graphics transmission. However, the present invention is not limited to the EMS. But information, including news, broadcast information, stock information, weather forecast, flight ticket booking, etc. can be provided as multimedia-type services containing moving pictures through a SMS (short message service) unit or a MMS (multimedia message service).

Figure 6:
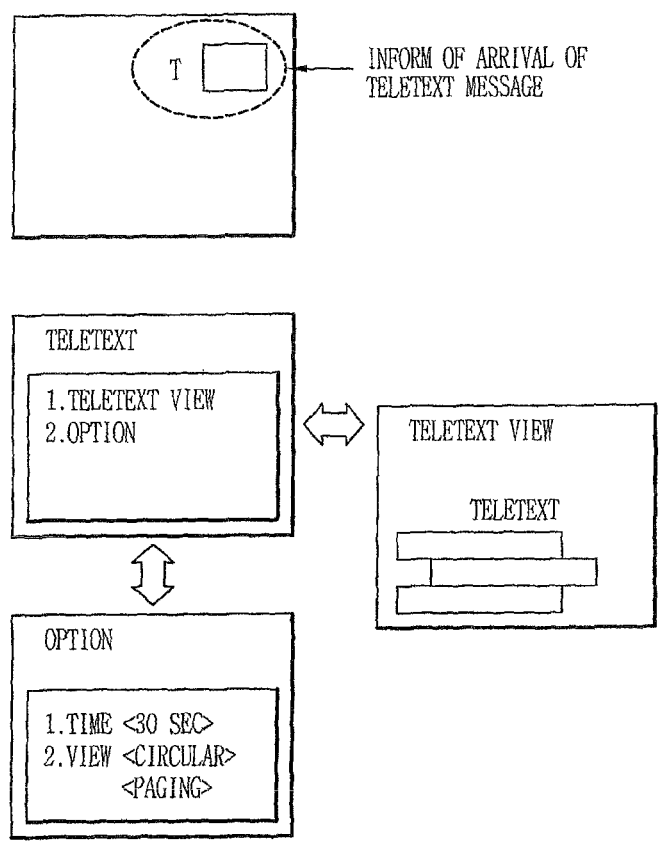
FIG. 6 is an illustrative view illustrating a method of processing a Teletext message in a mobile terminal upon receipt of Teletext information.

FIG. 6 is an illustrative view illustrating a method of processing a Teletext message in a mobile terminal upon receipt of Teletext information.

Referring to FIG. 6, once newly updated information on specific pages of a Teletext is received from the WAP server 20, the reception of update information on specific pages of a Teletexts is displayed on the Teletext update display unit 31 of the mobile terminal 30. Thus, the user can check specific pages stored in the Teletext buffer memory 33.

Meanwhile, the specific page information of the Teletext is processed and displayed on the screen on the basis of time information set by the user or the size of pages stored in the buffer memory unit. For example, the mobile terminal can be configured such that the received Teletext pages may be displayed on the screen all at once, displayed page by page in a scroll fashion, or displayed cyclically according to time intervals set by setting time options.

Although the present invention has been described with respect to a specific preferred embodiment thereof, various changes and modifications may be suggested to one skilled in the art and it is intended that the present invention encompass such changes and modifications as fall within the scope of the appended claims.

As described above, in the present invention, specific page information of a Teletext that the user wants among Teletext information provided by the Teletext service provider is stored in the database of the WAP server, and latest update information on specific pages of the Teletext is retrieved in the WAP server and automatically provided to the user through a service, such as EMS or the like, thereby enabling the user to be provided with latest updated specific page information of the Teletext even if the WAP is not accessed. Further, high-volume information, including graphics information, can be displayed. Further, a corresponding message is provided via the WAP server, thereby overcoming the problem that the reliability is limited regarding whether or not the corresponding message is received by the mobile terminal.

What is claimed is:

1. A mobile terminal, comprising:
 a wireless communication unit which receives text information from a WAP server;
 a processing circuit which registers subscription information related to specific page information of the text information in a WAP server and controls display of updated text information received from the WAP server, the subscription information identifying one or more pages of text information to be updated;
 a memory which stores the updated text information received from the WAP server; and
 a display unit which displays the updated text information stored in the memory; wherein:
 the wireless communication unit receives the updated text information automatically from the WAP server, the WAP server determining whether the specific page information is newly updated by using the registered subscription information, the updated text information is received only when the specific page information corresponding to the subscription information is newly updated, the processing circuit displays information indicating the receipt of the updated text information on the display when the text information newly updated based on the subscription information is received from the WAP server, the information displayed on the screen includes an icon indicating that the updated text information has been automatically received, and the processing circuit causes the display unit to display a first menu on the screen providing an option to view the updated text information, wherein the updated text information is not displayed if the option in the first menu is not selected, and displays a second menu including an option to control a manner of displaying the updated text information, said manner of displaying including at least one of a time or a format for viewing the updated text information wherein the text information corresponds to Teletext information and the specific page information corresponds to page information of the Teletext information, and wherein the updated text information is represented as multimedia-type information containing moving pictures through a MMS (multimedia message service) unit.

2. The mobile terminal of claim 1, wherein the processing circuit controls transmission of subscription information to the WAP server through the wireless communication unit.

3. The mobile terminal of claim 1, wherein the updated text information is represented as graphics information through an EMS (enhanced message service) unit.

4. The mobile terminal of claim 1, wherein the updated text information is displayed on a screen of the mobile terminal all at once, displayed page by page in a scroll fashion, or displayed cyclically according to time intervals set by setting time options.

5. An information providing system using a mobile terminal, comprising:
   a service provider which provides text information based on subscription information;
   a WAP server which retrieves and stores specific page information of the text information corresponding to the subscription information among the text information provided by the service provider, determines whether the stored specific page information of the text information is newly updated or not, and transmits the specific page information if newly updated; and
   a mobile terminal which registers subscription information related to specific page information of the text information in a WAP server, receives, processes and displays the newly updated transmitted from the WAP server, wherein:
   the WAP server only transmits the newly updated specific page information to the mobile terminal when the specific page information is newly updated,
   the mobile terminal displays information including an icon on a screen indicates that the specific page information newly updated based on the subscription information is received from the WAP server,
   the mobile terminal displays a first menu on the screen providing an option to view the newly updated specific page information, wherein the newly updated specific page information is not displayed if the option in the first menu is not selected, and displays a second menu including an option to control a manner of displaying the newly updated specific page information, said manner of displaying including at least one of a time or a format for viewing the newly updated specific page information, wherein the text information corresponds to Teletext information and the newly updated specific page information corresponds to page information of the Teletext information, wherein the information on specific pages includes a SMS (short message service) or multimedia-type information containing moving pictures.

6. The system of claim 5, wherein the WAP server comprises:
   an information retrieval unit which retrieves the specific page information of the text information provided by the service provider based on the subscription information;
   a database which stores the specific page information of the text information; and
   a processing circuit which automatically provides the newly updated specific page information to the mobile terminal when the processing circuit determines that the specific page information is newly updated information,
   wherein said determination is made by comparing the specific page information to the page information previously stored in the database based on the subscription information.

7. The system of claim 5, wherein the mobile terminal comprises:
   an update display unit which displays the reception of the newly updated specific page information received from the WAP server;
   a memory unit which stores the newly updated specific page information; and
   a processing circuit which controls processing and display of the newly updated specific page information based on time information set in the mobile terminal according to a user preference or a size of pages stored in the memory unit.

8. The system of claim 5, wherein the information on specific pages includes an EMS (enhanced message service).

9. The system of claim 5, wherein the mobile terminal is configured such that the newly updated specific page information is displayed all at once, displayed page by page in a scroll fashion, or displayed cyclically according to time intervals set by setting time options.

10. An information providing method using a mobile terminal, comprising:
    receiving subscription information related to specific page information of the text information from a mobile terminal, the subscription information identifying one or more pages of text information to be updated;
    storing, in a database of a WAP server, specific page information of text information provided by a service provider, the specific page information stored based on subscription information corresponding to the mobile terminal;
    storing, in the database of the WAP server, the specific page information corresponding to the subscription information of the mobile terminal among text information provided by a service provider;
    determining whether the stored specific page information is newly updated by comparing the stored specific page information to the specific page information of the text information previously stored in the database; and
    transmitting the newly updated specific page information to the mobile terminal only when the stored specific page information is determined to be newly updated,
    wherein the mobile terminal displays:

information including an icon on a screen indicating that the newly update specific page information corresponding to the subscription information is received from the WAP server, a first menu on the screen providing an option to view the newly updated specific page information, wherein the newly updated specific page information is not displayed if the option in the first menu is not selected, and a second menu including an option to control a manner of displaying the newly updated specific page information, said manner of displaying including at least one of a time or a format for viewing the newly updated specific page information, wherein the text information corresponds to Teletext information and the newly updated specific page information corresponds to page information of the Teletext information.

11. The method of claim 10, further comprising:

displaying information indicative of the specific page information as graphics through an EMS (enhanced message service) unit.

12. The method of claim 10, further comprising:

displaying information indicative of the specific page as multimedia-type information containing moving pictures through a MMS (multimedia message service) unit.

13. An information providing system using a mobile terminal, comprising:

subscribing to a specific page of text information from a service provider;

storing page information corresponding to the subscribed specific page among text information provided by a service provider in a database of a WAP server;

determining whether the specific page information is newly updated by comparing the specific page information to page information of the text information previously stored in the database based on the stored page information;

transmitting the newly updated specific page information to the mobile terminal only when the specific page information is determined as newly updated; and displaying information including an icon on a screen of the mobile terminal indicating that the that is newly updated specific page information is received from the WAP server, and displaying a first menu on the screen providing an option to view the newly updated specific page information, wherein the newly updated specific page information is not displayed if the option in the first menu is not selected, and displaying a second menu including an option to control a manner of displaying the newly updated specific page information, said manner of displaying including at least one of a time or a format for viewing the newly updated specific page information, wherein the text information corresponds to Teletext information and the newly updated specific page information corresponds to page information of the Teletext information, wherein the newly updated specific page information of the text information is represented as multimedia-type information containing moving pictures through a MMS (multimedia message service) unit.

14. The system of claim 13, further comprising:

establishing a first communication link to send the specific page information from the WAP server to the mobile terminal; and establishing a second communication link to send the specific page information from the service provider to the WAP server.

15. The system of claim 13, wherein the newly updated specific page information of the text information is processed and displayed based on time information set by a user or a size of pages stored in a memory unit.

16. The system of claim 13, wherein the newly updated specific page information is displayed with other page information on a screen of the mobile terminal all at once, the newly updated specific and other page information are displayed page by page in a scroll fashion, or the newly updated specific and other page information are displayed cyclically according to time intervals set by setting time options.

17. The system of claim 13, wherein the newly updated specific page information of the text information is represented as graphics information through an EMS (enhanced message service) unit.

18. The system of claim 5, wherein the WAP server determines whether the specific page information is newly updated based on a comparison between the specific page information and previously stored page information corresponding to the subscriber information.

* * * * *